(Model.)

P. HAYDEN.
Bridle Bit.

No. 243,042. Patented June 14, 1881.

Witnesses:
J. A. Rutherford
Vinton Coombe

Inventor:
Peter Hayden,
By James L. Norris
Atty.

UNITED STATES PATENT OFFICE.

PETER HAYDEN, OF NEW YORK, N. Y.

BRIDLE-BIT.

SPECIFICATION forming part of Letters Patent No. 243,042, dated June 14, 1881.

Application filed May 12, 1881. (Model.)

*To all whom it may concern:*

Be it known that I, PETER HAYDEN, a citizen of the United States, residing at New York, in the county of New York and State of New York, have invented new and useful Improvements in Bridle-Bits, of which the following is a specification.

The object of this invention is to provide improved means for enabling a person to hold a horse or other driving animal at the head of the latter; also, to adapt said means to constitute a device for guiding the animal to the right or to the left, and at the same time to prevent the bit from being drawn through or one of its ends being drawn into the animal's mouth. These objects I attain by means of a curved bar that is rigid with the mouth-piece of the bit and formed to pass down the sides and across the under jaw of the animal, so as to form a combined bail, guide, and guard-bar. By such means the bail can be grasped and held so as to place the animal under subjection; also, neither end of the bit can be drawn into the animal's mouth, and in either riding or driving, by simply drawing upon either rein, according to the direction in which it is desired the animal shall go, that side of the bail at the end of the bit drawn back by the rein will press against the side of the animal's jaw, which in effect constitutes the fulcrum for a lever composed of the bit and the bail, and thereby places the animal under easy control of the rider or driver, and compels it to turn or deviate from the line of travel as desired.

Figure 1:
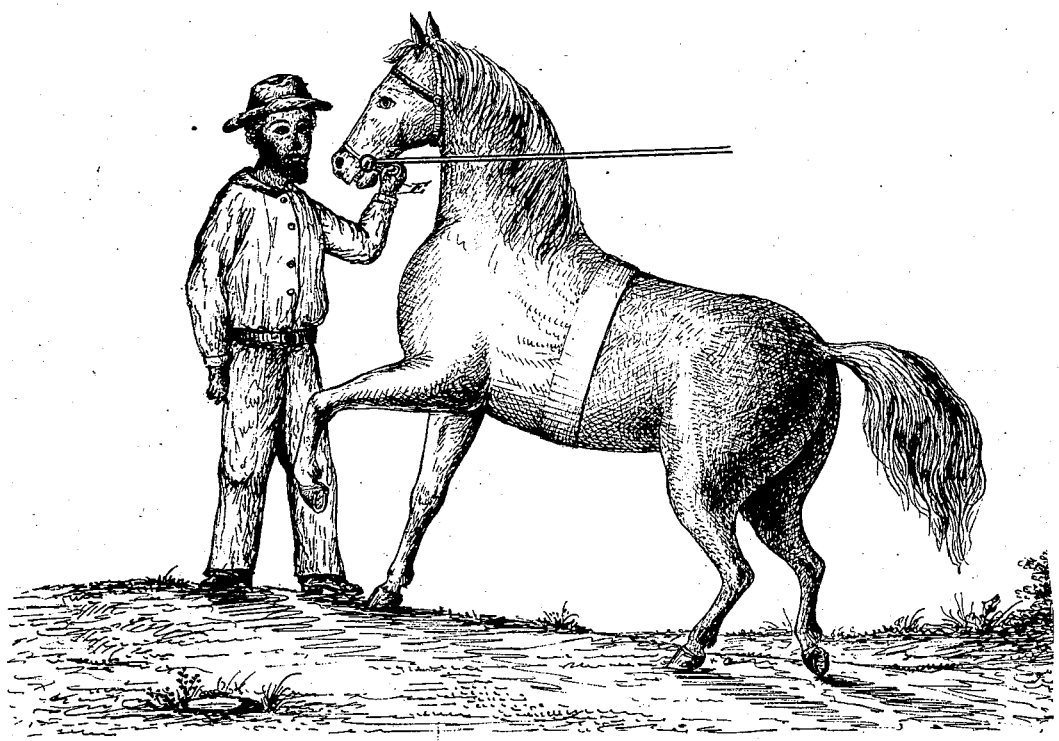
Figure 2:
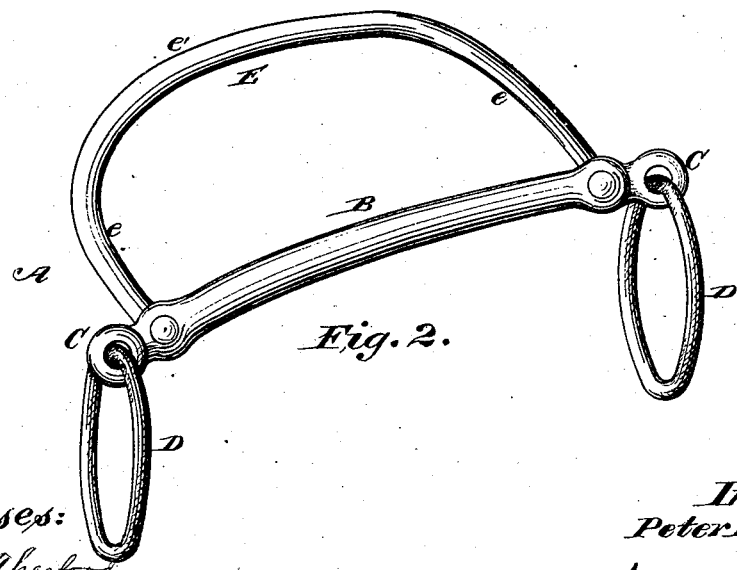

In the accompanying drawings, Figure 1 represents a horse with a bit provided with my improvement, said view also illustrating the way in which a person will employ the said improvement while holding the horse at its head. Fig. 2 is a perspective view of the bit with my improvement applied.

A indicates an ordinary stiff bridle-bit, the mouth-piece B of which can be straight or bent, according to the preference of the manufacturer. The end pieces, C, of the mouth-piece are either formed with said mouth-piece or secured thereto in any suitable way, and are provided with properly-sized perforations for the rein-rings D, which pass through them.

The bail E is made yoke-shaped and secured to the mouth-piece by passing its ends through perforations in the mouth-piece, near the ends of the latter, and then staving up or heading the ends of the bail. The said bail will be rigidly connected to the mouth-piece and additionally secured thereto by brazing, which will also effectively close any space intervening between the ends of the bail and the mouth-piece, so as to prevent the entrance of moisture and consequent oxidation of the metal.

When the bit is applied to the mouth of the animal in the usual way the bail will embrace the lower jaw of the animal, the sides $e\ e$ of said bail embracing the sides of the jaw, and the curved portion $e'$ of the said device passing below the under part of the jaw. After the bit has been made with my improvement the whole can be galvanized, nickel-plated, or finished in any appropriate manner.

It will be evident that this bail can be made of various sizes to adapt it to various-sized animals.

As illustrated in Fig. 1, the reins and headstall are connected with the rings, as usual, and the bail falls slightly back of a vertical plane.

The mouth-piece and bail will be made of wrought iron or steel or any other metal suitable for bits, and the lower portion of the bail will be at a sufficient distance below the under jaw of the animal, when the bail is in a horizontal plane, to enable a person to grasp it, so that he can readily hold the horse at the head and place the animal under subjection. This is of especial advantage in holding highly-spirited or unruly horses.

What I claim is—

1. In a bridle-bit, the herein-described bail, rigid with the mouth-piece of the bit and adapted to pass around the lower jaw of the animal, whereby the animal can be steered by drawing upon either end of the bit, so as to force one of the sides of the bail against the side of the animal's jaw, as set forth.

2. The combination, in a bridle bit, of the mouth-piece B and the rein-rings with the herein-described bail E, having its ends passed through the mouth-piece near the ends of the latter, and secured thereto, substantially in the manner and for the purpose set forth.

In testimony whereof I have hereunto set my hand in the presence of two subscribing witnesses.

PETER HAYDEN.

Witnesses:
GEO. S. HICKOK,
ADAM HILL.